United States Patent
Ehsan et al.

(10) Patent No.: US 10,007,317 B2
(45) Date of Patent: Jun. 26, 2018

(54) TECHNIQUES FOR CONTROLLING POWER USAGE BASED ON NETWORK PARAMETERS

(71) Applicant: QUALCOMM Incorporated, San Diego, CA (US)

(72) Inventors: Navid Ehsan, San Diego, CA (US); Praveen Appu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 14/519,855

(22) Filed: Oct. 21, 2014

(65) Prior Publication Data

US 2015/0293574 A1    Oct. 15, 2015

Related U.S. Application Data

(60) Provisional application No. 61/978,084, filed on Apr. 10, 2014.

(51) Int. Cl.
*G06F 1/26*      (2006.01)
*G06F 1/32*      (2006.01)
*H04W 52/02*   (2009.01)

(52) U.S. Cl.
CPC ............ *G06F 1/3206* (2013.01); *G06F 1/324* (2013.01); *G06F 1/3234* (2013.01); *G06F 1/3296* (2013.01); *H04W 52/029* (2013.01); *H04W 52/0229* (2013.01); *H04W 76/28* (2018.02); *Y02D 70/00* (2018.01); *Y02D 70/1242* (2018.01); *Y02D 70/1262* (2018.01); *Y02D 70/142* (2018.01); *Y02D 70/146* (2018.01);

(Continued)

(58) Field of Classification Search
CPC ...... G06F 1/3206; G06F 1/3234; G06F 1/324; G06F 1/3296; G06F 1/32; H04W 52/0229; H04W 52/029; H04W 76/048; Y02B 60/50
USPC .......................................................... 713/320
See application file for complete search history.

(56) References Cited

U.S. PATENT DOCUMENTS 5,995,488 A * 11/1999 Kalkunte ............ H04L 12/4013
                                                                370/232
6,799,251 B1 * 9/2004 Jacobs ............... G06F 17/30902
                                                                707/E17.12

(Continued)

FOREIGN PATENT DOCUMENTS

EP          1903814 A2       3/2008

OTHER PUBLICATIONS

International Search Report and Written Opinion—PCT/US2015/022588—ISA/EPO—Jun. 12, 2016.

(Continued)

*Primary Examiner* — Nitin Patel
(74) *Attorney, Agent, or Firm* — Austin Rapp

(57) ABSTRACT

A method for power optimization by an apparatus is disclosed. The method includes identifying one or more network parameters that affect one or more of a processing rate and a power usage of the processor in a connected state. The method also includes identifying a trigger event for the one or more network parameters. The method further includes adjusting a performance of the processor in the connected state when the trigger event occurs.

30 Claims, 9 Drawing Sheets

(52) U.S. Cl.
CPC .............. *Y02D 70/23* (2018.01); *Y02D 70/24* (2018.01); *Y02D 70/25* (2018.01)

(56) References Cited

U.S. PATENT DOCUMENTS

| | | | | |
|---|---|---|---|---|
| 2008/0307244 | A1* | 12/2008 | Bertelsen | G06F 1/3203 713/323 |
| 2008/0310485 | A1* | 12/2008 | Soliman | H04B 1/7115 375/147 |
| 2009/0016239 | A1* | 1/2009 | Honjo | H04W 28/16 370/253 |
| 2009/0135752 | A1* | 5/2009 | Su | H04W 52/029 370/311 |
| 2010/0069128 | A1* | 3/2010 | Cheng | G06F 1/3203 455/574 |
| 2010/0325267 | A1 | 12/2010 | Mishra et al. | |
| 2011/0085607 | A1* | 4/2011 | Dhandu | H04L 1/0002 375/259 |
| 2011/0269462 | A1* | 11/2011 | Sagfors | H04W 36/36 455/436 |
| 2012/0076011 | A1* | 3/2012 | Gobriel | H04W 52/0258 370/252 |
| 2012/0236834 | A1 | 9/2012 | Ho et al. | |
| 2013/0021995 | A1 | 1/2013 | Ehsan et al. | |
| 2013/0182622 | A1* | 7/2013 | Lin | H04W 52/0251 370/311 |
| 2013/0210420 | A1 | 8/2013 | Deivasigamani et al. | |
| 2013/0210481 | A1 | 8/2013 | Sane | |
| 2013/0343252 | A1 | 12/2013 | Chakraborty et al. | |

OTHER PUBLICATIONS

Sauter M., "Long Term Evolution (LTE), In: From GSM to LTE", Dec. 24, 2010 (Dec. 24, 2010), John Wiley & Sons, XP055117639, ISBN: 978-0-47-066711-8, pp. 205-276, DOI: 10.1002/9780470978238.ch4.

* cited by examiner

TECHNIQUES FOR CONTROLLING POWER USAGE BASED ON NETWORK PARAMETERS

CROSS-REFERENCE TO RELATED APPLICATION

This application is related to and claims priority to U.S. Provisional Patent Application Ser. No. 61/978,084 filed 10 Apr. 2014, for "TECHNIQUES FOR REDUCING POWER CONSUMPTION BASED ON NETWORK PARAMETERS" which is incorporated by reference in its entirety.

FIELD OF THE DISCLOSURE

The present disclosure relates generally to wireless communication systems. More specifically, the present disclosure relates to techniques for power optimization based on network parameters.

BACKGROUND

Wireless communication systems are widely deployed to provide various types of communication content such as voice, video, data, and so on. These systems may be multiple-access systems capable of supporting simultaneous communication of multiple wireless communication devices with one or more base stations.

As the functionality of wireless communication devices has become more complicated, so has the desire to maximize battery life. Power optimization techniques may be used to extend battery life. Benefits may therefore be realized by implementing power optimization techniques in a wireless communication device.

SUMMARY

The present disclosure, relates to one or more techniques for power optimization based on network parameters.

A method for power optimization is described. One or more network parameters are identified that may affect one or more of a processing rate and a power usage of a processor in a connected state. A trigger event may be identified for the one or more network parameters. A performance of the processor may be adjusted in the connected state when the trigger event occurs.

The trigger event for the one or more network parameters may be configurable while the processor is in the connected state. The trigger event for the one or more network parameters may also be pre-programmed before the processor is in the connected state. The trigger event for the one or more network parameters may be an event indicating the processor is ready for a power state change.

The network parameters may include one or more of a transfer block size, periodicity of uplink or downlink grants, a number of resource blocks used, modulation and coding scheme information, a signal-to-noise ratio, Doppler information, a transmission mode, a secondary cell status and a hybrid automatic repeat request (HARQ) status. The network parameters may also include one or more of a traffic pattern parameters, channel condition parameters, static configuration parameters, and transmission mode configuration of a signal. The channel condition parameters being monitored may be a Channel Quality Indicator (CQI) report of a Modulation Coding Scheme (MCS) used in a signal. The adjustment of the performance of the processor may cause the processor to enter a power saving mode. The adjustment of the performance of the processor may include adjusting one or more of a clock rate and a voltage level for specific rails within the processor. The adjustment of the performance of the processor may cause the processor to enter a regular power mode.

An apparatus for power optimization is also described. The apparatus includes a processor, memory in electronic communication with the processor and instructions stored in the memory. The instructions may be executable to identify one or more network parameters that affect one or more of a processing rate and a power usage of a processor in a connected state. The instructions may also be executable to identify a trigger event for the one or more network parameters. The instructions may further be executable to adjust a performance of the processor in the connected state when the trigger event occurs.

A non-transitory computer-readable medium for power optimization is also described. The non-transitory computer-readable medium includes instructions. The instructions may include code for identifying one or more network parameters that affect one or more of a processing rate and a power usage of a processor in a connected state. The instructions may also include code for identifying a trigger event for the one or more network parameters. The instructions may further include code for adjusting a performance of the processor in the connected state when the trigger event occurs.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Wireless communication networks are widely deployed to provide various types of communication content such as voice, data, and so on. Many wireless communication networks have one or more wireless communication devices communicating with base stations. The wireless communication devices may transmit or receive at low data rates. Wireless communication devices may require power to operate, and the power may come from a battery. When a wireless communication device is communicating at a low data rate, the processing power needed to manage the data may be decreased to reduce power consumption by the wireless communication device. Decreasing the processing power may extend the time between charging the battery or lower the cost associated with providing power to the wireless communication device.

Figure 1:
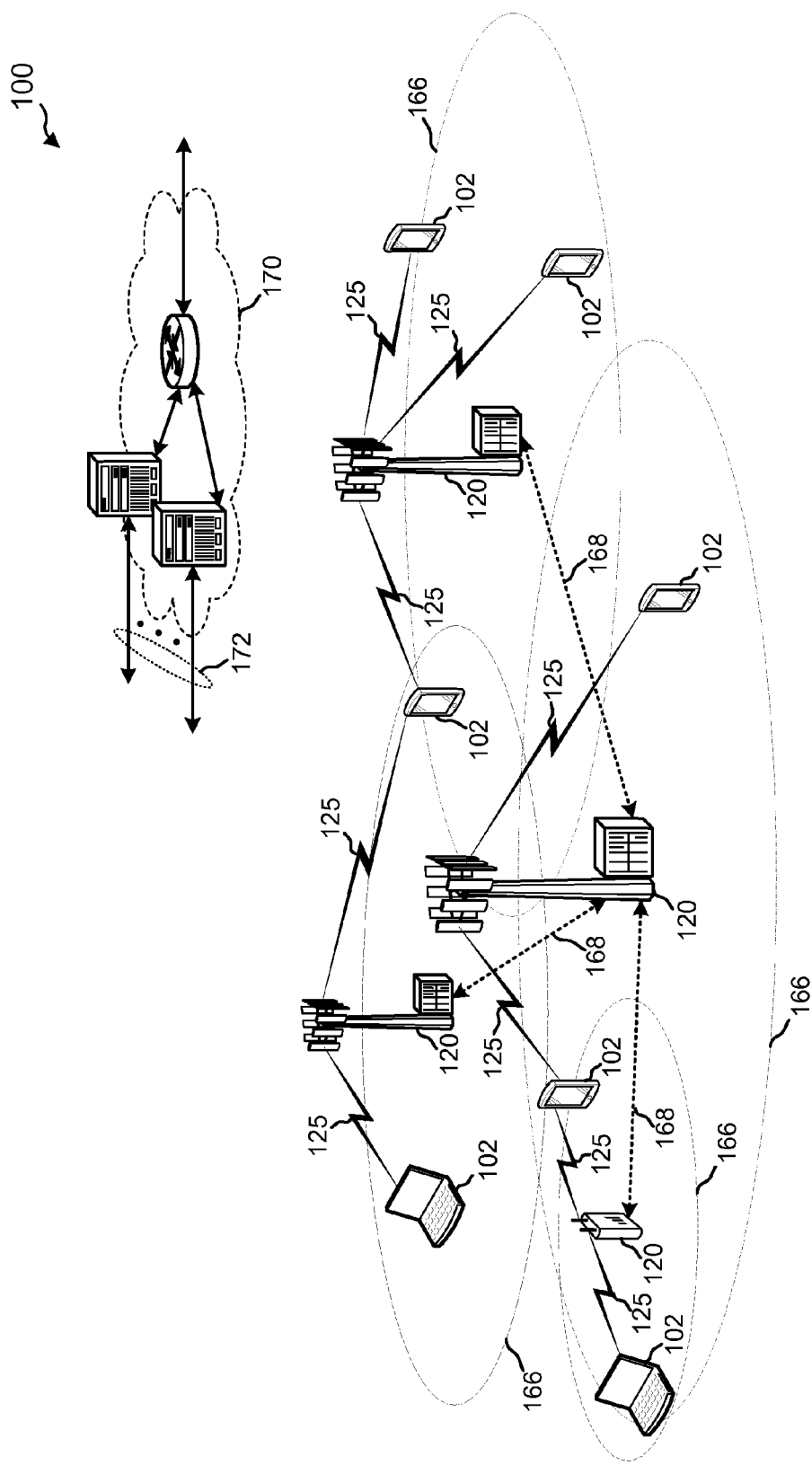
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 120, UEs 102, and a core network 170. The core network 170 may provide user authentication, access authorization, tracking, Internet Protocol (IP) connectivity, and other access, routing, or mobility functions. The base stations 120 may interface with the core network 170 through backhaul links 172 (e.g., S1, etc.) and may perform radio configuration and scheduling for communication with the UEs 102, or may operate under the control of a base station controller (not shown). In various examples, the base stations 120 may communicate, either directly or indirectly (e.g., through core network 170), with each other over backhaul links 168 (e.g., X1, etc.), which may be wired or wireless communication links.

The base stations 120 may wirelessly communicate with the UEs 102 via one or more base station antennas. Each of the base station 120 sites may provide communication coverage for a respective geographic coverage area 166. In some examples, a base station 120 may be referred to as a base transceiver station, a radio base station, an access point, a radio transceiver, a NodeB, an eNodeB (eNB), a Home NodeB, a Home eNodeB, or some other suitable terminology. The geographic coverage area 166 for a base station 120 may be divided into sectors making up a portion of the coverage area (not shown). The wireless communication system 100 may include base stations 120 of different types (e.g., macro or small cell base stations). There may be overlapping geographic coverage areas 166 for different technologies.

In some examples, the wireless communication system 100 may include an LTE/LTE-A network. In LTE/LTE-A networks, the term evolved Node B (eNB) may be used to describe the base stations 120, while the term UE may be used to describe wireless communication devices 102 described with reference to FIGS. 3, 7 and 9 and the UE described with reference to FIG. 2. The wireless communication system 100 may be a Heterogeneous LTE/LTE-A network in which different types of eNBs provide coverage for various geographical regions. For example, each eNB or base station 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 102 and the base stations 120 or core network 170 supporting radio bearers for the user plane data. At the Physical (PHY) layer, the transport channels may be mapped to Physical channels.

The UEs 102 may be dispersed throughout the wireless communication system 100, and each UE 102 may be stationary or mobile. A UE 102 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 102 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 120 to a UE 102, or uplink (UL) transmissions from a UE 102 to a base station 120. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced PUSCH (ePUSCH). UL transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIG. 2), or a scheduling request (SR) or enhanced SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some configurations of the wireless communication system 100, base stations 120 or UEs 102 may include multiple antennas for employing antenna diversity schemes to improve communication quality and reliability between base stations 120 and UEs 102. Additionally or alternatively, base stations 120 or UEs 102 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 102 may be configured with multiple downlink CCs and one or more uplink CCs for carrier aggregation. Carrier aggregation may be used with both FDD and TDD component carriers.

The wireless communication system 100 may also or alternatively support operation over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). Upon winning a contention for access to the unlicensed radio frequency spectrum band, a transmitting apparatus (e.g., a base station 120 or UE 102) may transmit one or more CUBS over the unlicensed radio frequency spectrum band. The CUBS may serve to reserve the unlicensed radio frequency spectrum by providing a detectable energy on the unlicensed radio frequency spectrum band. The CUBS may also serve to identify the transmitting apparatus or serve to synchronize the transmitting apparatus and a receiving apparatus. In some examples, a CUBS transmission may commence at a symbol period boundary (e.g., an OFDM symbol period boundary). In other examples, a CUBS transmission may commence between symbol period boundaries. In these latter examples, the transmission of a portion of a CUBS, which portion of a CUBS has a length that is shorter than a full symbol period, may provide a non-orthogonal transmission that interferes with one or more transmissions on adjacent tones (e.g., one or more transmissions of other apparatuses on adjacent tones).

Figure 2:
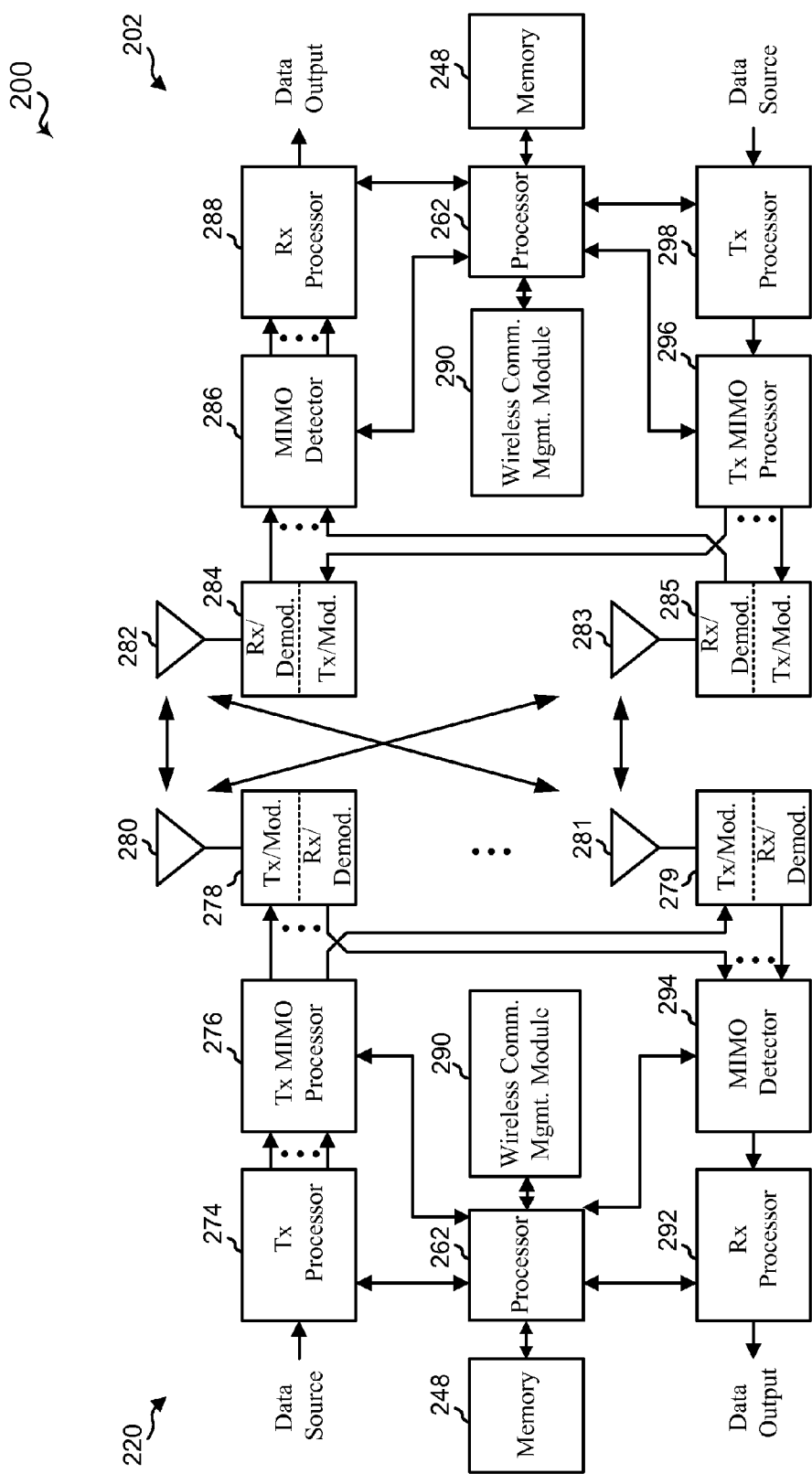
FIG. 2 is a block diagram of a multiple input/multiple output (MIMO) communication system including a base station and a UE, in accordance with various aspects of the present disclosure.

FIG. 2 is a block diagram of a multiple input/multiple output (MIMO) communication system 200 including a base station 220 and a UE 202, in accordance with various aspects of the present disclosure. The MIMO communication system 200 may illustrate aspects of the wireless communication system 100 described with reference to FIG. 1. The base station 220 may be an example of aspects of the base station 120, 320 or 720 described with reference to FIG. 1, 3 or 7. The base station 220 may be equipped with antennas 280 through 281, and the UE 202 may be equipped with antennas 282 through 283. In the MIMO communication system 200, the base station 220 may be able to send data over multiple communication links at the same time. Each communication link may be called a "layer" and the "rank" of the communication link may indicate the number of layers used for communication. For example, in a 2×2 MIMO communications system where base station 220 transmits two "layers," the rank of the communication link between the base station 220 and the UE 202 is two.

At the base station 220, a transmit processor 274 may receive data from a data source. The transmit processor 274 may process the data. The transmit processor 274 may also generate control symbols or reference symbols. A transmit (TX) MIMO processor 276 may perform spatial processing (e.g., precoding) on data symbols, control symbols, or reference symbols, if applicable, and may provide output symbol streams to the transmit modulators 278 through 279. Each modulator 278 through 279 may process a respective output symbol stream (e.g., for OFDM, etc.) to obtain an output sample stream. Each modulator 278 through 279 may further process (e.g., convert to analog, amplify, filter, and upconvert) the output sample stream to obtain a DL signal. In one example, DL signals from modulators 278 through 279 may be transmitted via the antennas 280 through 281, respectively.

The UE 202 may be an example of aspects of the UE 102 described with reference to FIG. 1 or the wireless communication device described with reference to FIG. 3, 7 or 9. At the UE 202, the UE antennas 282 through 283 may receive the DL signals from the base station 220 and may provide the received signals to the demodulators 284 through 285, respectively. Each demodulator 284 through 285 may condition (e.g., filter, amplify, downconvert, and digitize) a respective received signal to obtain input samples. Each demodulator 284 through 285 may further process the input samples (e.g., for OFDM, etc.) to obtain received symbols. A MIMO detector 286 may obtain received symbols from all the demodulators 284 through 285, perform MIMO detection on the received symbols, if applicable, and provide detected symbols. A receive processor 288 may process (e.g., demodulate, deinterleave, and decode) the detected symbols, providing decoded data for the UE 202 to a data output, and provide decoded control information to a processor 262, or memory 248.

The processor 262 may in some cases execute stored instructions to instantiate a wireless communication management module 290. The wireless communication management module 290 may be an example of aspects of the network parameters module 308*a*, 308*b* and 708 described with reference to FIG. 3 or 7.

On the uplink (UL), at the UE 202, a transmit processor 298 may receive and process data from a data source. The transmit processor 298 may also generate reference symbols for a reference signal. The symbols from the transmit processor 298 may be precoded by a transmit MIMO processor 296 if applicable, further processed by the modulators 284 through 285 (e.g., for SC-FDMA, etc.), and be transmitted to the base station 220 in accordance with the transmission parameters received from the base station 220. At the base station 220, the UL signals from the UE 202 may be received by the antennas 280 through 281, processed by the demodulators 278 through 279, detected by a MIMO detector 294 if applicable, and further processed by a receive processor 292. The receive processor 292 may provide decoded data to a data output and to the processor 262 or memory 248.

The processor 262 may in some cases execute stored instructions to instantiate a wireless communication management module 290. The wireless communication management module 290 may be an example of aspects of the network parameters module 308*a*, 308*b* and 708 described with reference to FIG. 3 or 7.

The components of the UE 202 may, individually or collectively, be implemented with one or more ASICs adapted to perform some or all of the applicable functions in hardware. Each of the noted modules may be a means for performing one or more functions related to operation of the MIMO communication system 200. Similarly, the components of the base station 220 may, individually or collectively, be implemented with one or more ASICs adapted to perform some or all of the applicable functions in hardware. Each of the noted components may be a means for performing one or more functions related to operation of the MIMO communication system 200.

Figure 3:
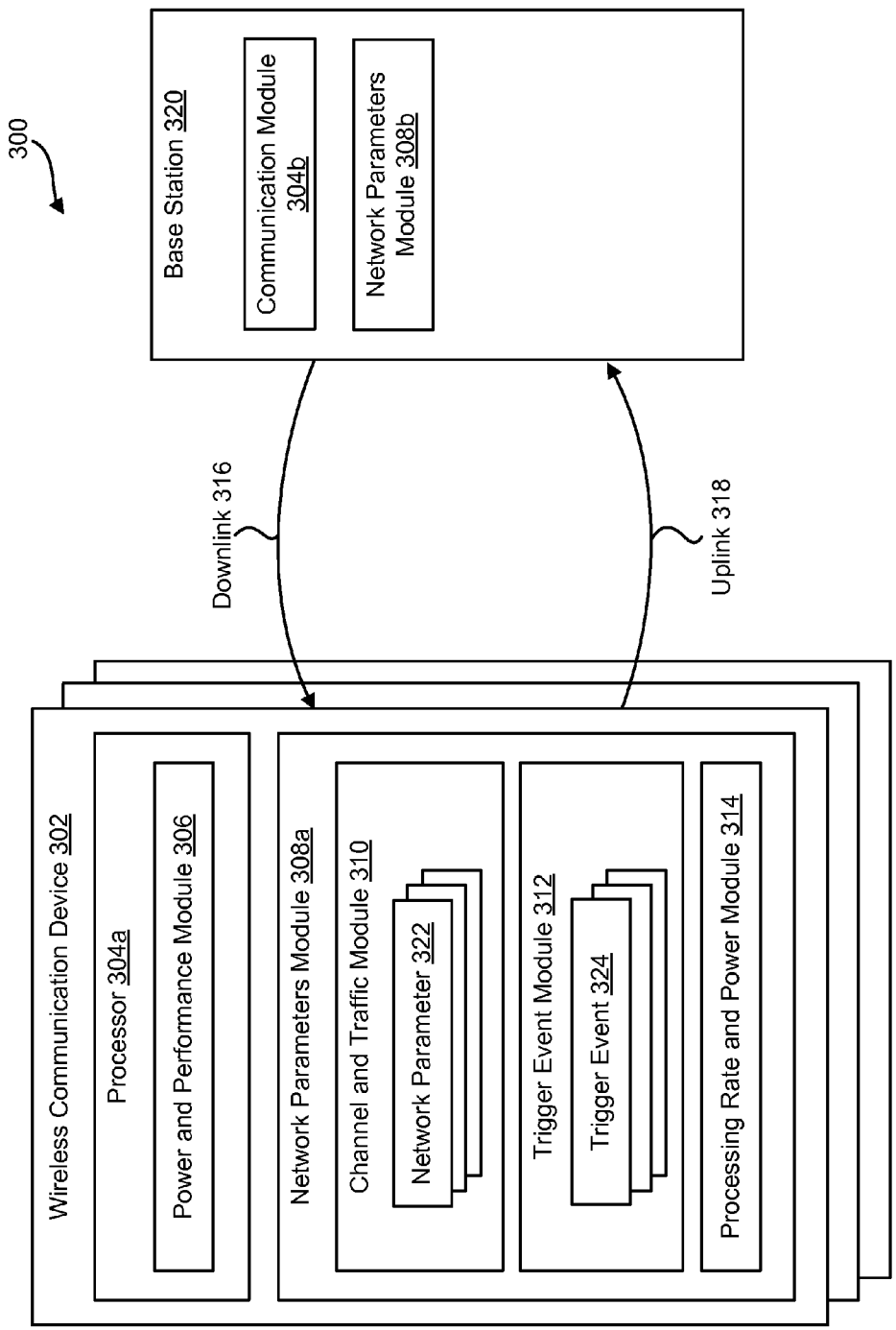
FIG. 3 shows a wireless communication system with multiple wireless devices in accordance with various aspects of the present disclosure.

FIG. 3 shows a wireless communication system 300 with multiple wireless communication devices 302 in accordance with various aspects of the present disclosure. A wireless device may be a base station 320 or a wireless communication device 302. A wireless communication device 302 may be configured for power optimization based on network parameters 322. Thus, a wireless communication device 302 may be configured to reduce power based on measured or observed network parameters 322.

A base station 320 may be a station that communicates with one or more wireless communication devices 302. A base station 320 may also be referred to as, and may include some or all of the functionality of, an access point, a broadcast transmitter, a NodeB, an evolved NodeB, etc. Each base station 320 may provide communication coverage for a particular geographic area. A base station 320 may provide communication coverage for one or more wireless communication devices 302. The term "cell" can refer to a base station 320 and/or its coverage area depending on the context in which the term is used.

A base station 320 may include a network parameters module 308*b* and a communication module 304*b*. The communication module 304*b* may be used to communicate with the one or more wireless communication devices 302. The communication module 304*b* may be one or more of a processor, an envelope tracker, a radio frequency (RF) processor, a power management processor, and a transceiver. The communication between the base station 320 and wireless communication device 302 may be achieved through an uplink 318 and a downlink 316. The uplink 318 may be used by the wireless communication device 302 to send and request data from the base station 320. The downlink 316 may be used by the base station 320 to send and request data from the wireless communication device 302. Through the uplink 318 and downlink 316 the wireless communication device 302 and base station 320 may be able to communicate via a duplex link.

The wireless communication device 302 may be referred to as or may include some or all of the functionality of a "user equipment" (UE), a terminal, an access terminal, a subscriber unit, a station, etc. A wireless communication device may be a cellular phone, a personal digital assistant (PDA), a wireless device, a wireless modem, a handheld device, a laptop computer, etc.

The wireless communication device 302 may include a network parameters module 308*a* and a processor 304*a*. The processor 304*a* may include one or more of a processor, an envelope tracker, a radio frequency (RF) processor, a power management processor and a transceiver. The network parameters module 308*a* may include a channel and traffic module 310, trigger event module 312, and a processing rate and power module 314. The channel and traffic module 310 may be able to access and monitor the uplink 318 and downlink 316 between the wireless communication device 302 and the base station 320. The channel and traffic module 310 may monitor the traffic patterns and channel conditions (e.g., a Channel Quality Indicator (CQI), a rank indicator (RI) and/or a Modulation Coding Scheme (MCS)) of the uplink 318 and downlink 316 and store one or more network parameters 322. For example, the channel and traffic module 310 may monitor the transfer block size, periodicity of uplink and downlink grants, and a combination of resource block (RB) and modulation and coding scheme (MCS). For another example, the channel and traffic module 310 may monitor signal to noise ratio and Doppler of the uplink 318 and downlink 316. The network parameters 322 monitored by the channel and traffic module 310 may include traffic pattern parameters, channel condition parameters, static configuration parameters, and other parameters. Traffic pattern parameters may include the transfer block (TB) size, the periodicity of UL or DL grants, the number of RBs, the MCS information, and an RB and MCS combination.

The channel and traffic module 310 may monitor the uplink 318 and downlink 316 for a pre-defined window of time. During the pre-defined window of time the average, minimum, and/or maximum values of the different network parameters 322 that are being monitored may be recorded. Lower-layer configuration data may also be accessible by the channel and traffic module 310. The lower-layer configuration data may be transmission mode data and HARQ status. The channel and traffic module 310 may extract the network parameters 322 to provide this information to the trigger event module 312.

The trigger event module 312 may include pre-programmed or configured trigger events 324 for the processor 304a. The trigger events 324 may determine when the power settings of the processor 304a are adjusted and when the processor 304a enters a power saving mode or a regular power mode. The trigger event module 312 may use the network parameters 322 collected by the channel and traffic module 310 in conjunction with the pre-programmed or configured trigger events 324 to make the determination. For example, the channel and traffic module 310 may average the size of the transfer blocks and may send data to the trigger event module 312. The trigger event module 312 may monitor the average size of the transfer blocks and may determine when the average transfer block size reaches a size indicated in the pre-programmed or configured trigger events 324. Once the indicated size is reached, the trigger event module 312 may send data to a power and performance module 306 located on the processor 304a.

The trigger event module 312 may also provide an interface for developers to pre-program or configure the trigger events 324. The trigger events 324 may be pre-programmed or configured before or while the processor 304a is in a connected state. In one exemplary trigger event 324, the average number of resource blocks in a 100-millisecond (ms) window may be used to indicate the processor 304a is ready to enter the power saving mode. As another example, a trigger event 324 may use the average number of resource blocks in a 200 ms window and the modulation and coding scheme for a 400 ms window to indicate the processor 304a is ready to enter the power saving mode.

Furthermore, trigger events 324 for leaving the power saving mode (e.g., to return to regular power mode) may also be pre-programmed or configurable. For example, a trigger event 324 may use the average size of transfer blocks, and set a value that indicates a ceiling for the average size of transfer blocks the processor 304a can process while in the power saving mode. Once the average size of the transfer blocks becomes larger than the size indicated in the trigger event 324, the power saving optimization may be disabled and the processor 304a may enter the regular power mode. As another example, a trigger event 324 may use a current transmission mode of the wireless communication device 302 to indicate when the processor 304a may enter the regular power mode to better handle a change in transmission mode. The wireless communication device 302 may currently be receiving data in the simplex mode from the base station 320 through the downlink 316. The data being transmitted may comprise a request for data located within the wireless communication device 302. The requested data may be transmitted to the base station 320 through the uplink 318. Transferring the data may cause the transmission mode to change from a simplex mode to a duplex mode. Entering the duplex mode may be a trigger event 324 and may cause the processor 304a to enter the regular power mode.

The processing rate and power module 314 may determine whether the power or performance of the processor 304a should be adjusted. This determination may depend on what trigger event 324 occurred. For example, if the trigger event 324 indicated that the signal-to-noise ratio has reached an undesirable level, the processing rate and power module 314 may determine that the power settings in the processor 304a should be increased in order to improve the signal-to-noise ratio. The processing rate and power module 314 may then send instructions to the processor 304a instructing the processor 304a to increase its power. The processor 304a may receive the instructions from the processing rate and power module 314 and make adjustments using a power and performance module 306. For example, the processor 304a may increase the power being sent to an antenna to increase the range of the antenna and increase the signal power. Increasing the signal power may improve the signal-to-noise ratio. For another example, the processor 304a may be able to filter the noise more efficiently when in the regular power mode.

Figure 4:
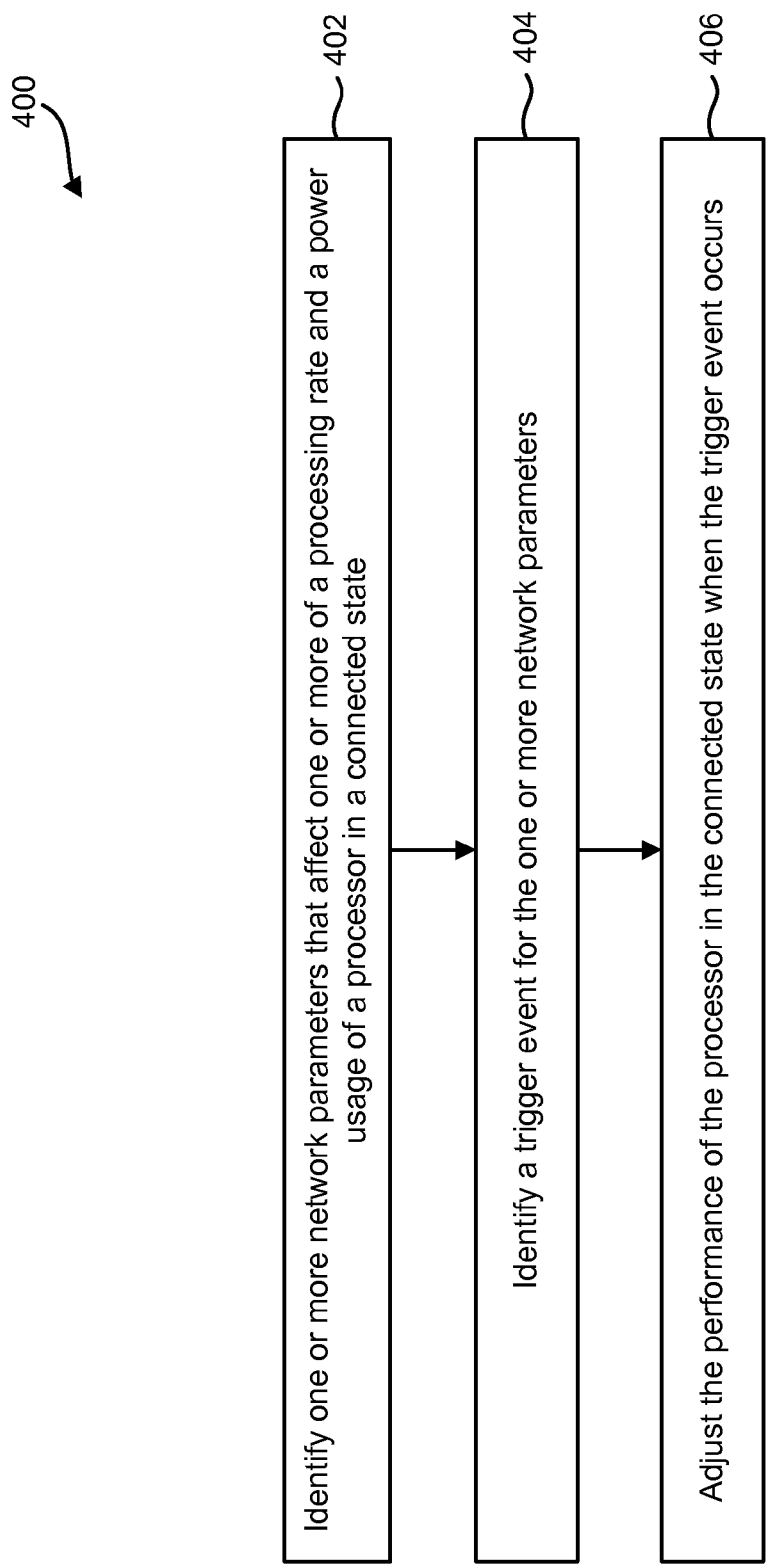
FIG. 4 is a flow diagram of a method for adjusting a power mode for a processor on a wireless communication device in accordance with various aspects of the present disclosure.

FIG. 4 is a flow diagram of a method 400 for adjusting a power mode for a processor 304a on a wireless communication device 302 in accordance with various aspects of the present disclosure. The method 400 may be performed by the wireless communication device 302. In one configuration, the method 400 may be performed by a network parameters module 308a on the wireless communication device 302.

The wireless communication device 302 may identify 402 one or more network parameters 322 that affect one or more of the processing rate and the power usage of the processor 304a in the connected state. The connected state may be a state in which the processor 304a is in active communication. The wireless communication device 302 may identify 404 a trigger event 324 for the one or more network parameters 322. The trigger event 324 may be pre-programmed or configured by an end user. The wireless communication device 302 may then adjust 406 the performance of the processor 304a when one or more of the trigger events 324 occur. For example, the wireless communication device 302 may place the processor 304a in a power saving mode if the network parameters 322 indicate that a power saving mode will not significantly reduce the performance of the processor 304a. In another example, the wireless communication device 302 may place the processor 304a in a regular power mode if the network parameters 322 indicate that the processor 304a needs more processing power. The change from a power saving mode to a regular power mode or from a regular power mode to a power saving mode may be referred to as a power state change.

Figure 5:
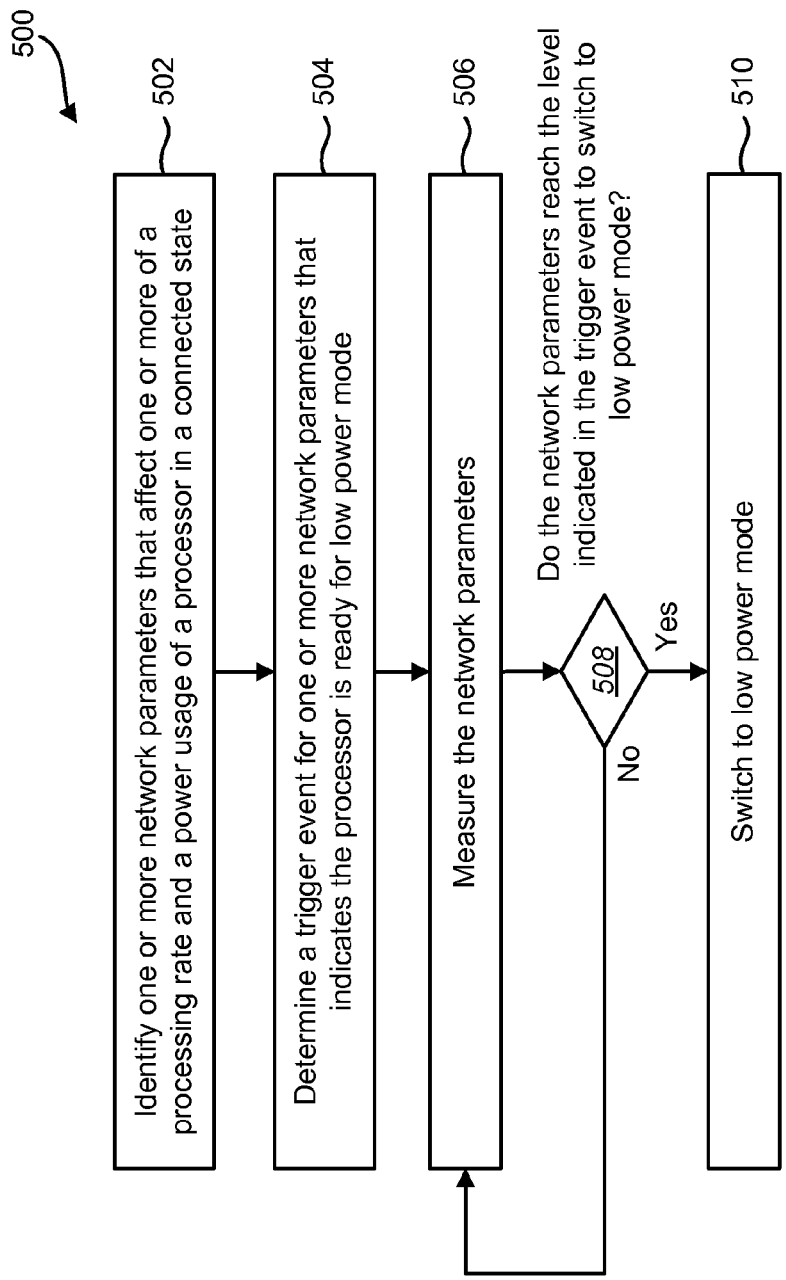
FIG. 5 is a flow diagram of a method for triggering low-power mode for a processor on a wireless communication device in accordance with various aspects of the present disclosure.

FIG. 5 is a flow diagram of a method 500 for triggering power saving mode for a processor 304a on a wireless communication device 302 in accordance with various aspects of the present disclosure. The method 500 may be performed by the wireless communication device 302 with a processor 304a in a connected state. In one configuration, the method 500 may be performed by a network parameters module 308a on the wireless communication device 302. The wireless communication device 302 may identify 502 one or more network parameters 322 that affect one or more of the processing rate and the power usage of the processor 304a in the connected state. The connected state may be a state in which the processor 304a is in active communication. The wireless communication device 302 may determine 504 a trigger event 324 for one or more network parameters 322 that indicates the processor 304a is ready for power saving mode. The wireless communication device 302 may measure 506 one or more network parameters 322. For example, the wireless communication device 302 may measure how often light sleep is triggered during a specified window of time. For another example, the wireless communication device 302 may measure the Doppler information of the signal.

The wireless communication device 302 may determine 508 if the levels of the one or more network parameters 322 reach a level indicated in the trigger event 324 to switch to power saving mode. If the levels of the network parameters 322 reach the level indicated in the trigger event 324, the processor 304a may switch 510 to power saving mode. For example, the average channel quality over a specified period of time may be high enough that the performance of the processor 304a may be reduced in order to conserve power without causing a significant drop in the signal quality. If the wireless communication device determines 508 the levels of the network parameters 322 do not reach the level indicated in the trigger event 324, the processor 304a may continue measuring 506 the network parameters 322 to determine if the level of the network parameters 322 reach the level indicated in the trigger event 324.

There may be many optimizations that may be used when placing a processor 304a in power saving mode. For example, benefits may be realized by dynamically adjusting the number of requests being sent by components located within the wireless communication device 302. For example, the number of systems network operations center (SNOC) requests may be reduced to improve power consumption. The SNOC requests may be sent by the wireless communication device 302. The SNOC requests may be used to adjust how fast the processor 304a can read and write to double data rate (DDR) memory. For another example, the number of bus interference memory controller (BIMC) requests may be reduced to improve power consumption as well. The bus interface memory controller may be a bus that allows the processor 304a to access DDR memory. Reducing the number of BIMC requests may reduce the amount of bus traffic and processing that is required by the processor 304a. Since the wireless communication device 302 may currently processing a small amount of data, the processor 304a may not access the DDR memory as frequently.

Another benefit may be realized by lowering the Q6 floor (i.e., the processor 304a processor floor). Lowering the Q6 floor may be equivalent to lowering the clock rate of a processor. Lowering the clock rate of the processor 304a may reduce the power needed to properly receive or send data. If the clock rate is lowered, the processor 304a may increase the length of time the processor may take to handle a burst of data. Lowering the Q6 floor of the processor 304a may be acceptable for low data rates. If the data rate is high, the processor may not handle data in timely manner and may miss data.

Other benefits may be realized by reducing the sample rate for an analog-to-digital converter (ADC). Reducing the sample rate for an ADC may reduce power consumption by the processor 304a by reducing the number of commands and processing being performed by the processor 304a. An ADC may take a continuous analog signal and convert it to a high or low digital output signal based on the level of the analog signal. If the network parameters 322 indicate the processor 304a is using a low data rate, the rate at which the analog signal changes from low to high or high to low may be reduced and may allow the sampling rate to be reduced. This may allow the number of samples of the analog signal to be reduced without causing major data loss or signal quality degradation.

Another benefit may be realized by changing the reference signal for a radio frequency (RF) phase locked loop (PLL). Power consumption may also be reduced by reducing dynamic receiving diversity (RxD) by the processor 304a. Dynamic receiving diversity may indicate that the diversity receive chain may be disabled by the processor 304a to match the protocol used by the wireless network. Reducing the number of times the network protocol is sampled may reduce the amount of power consumed by the processor 304a, since less processing may be used.

Figure 6:
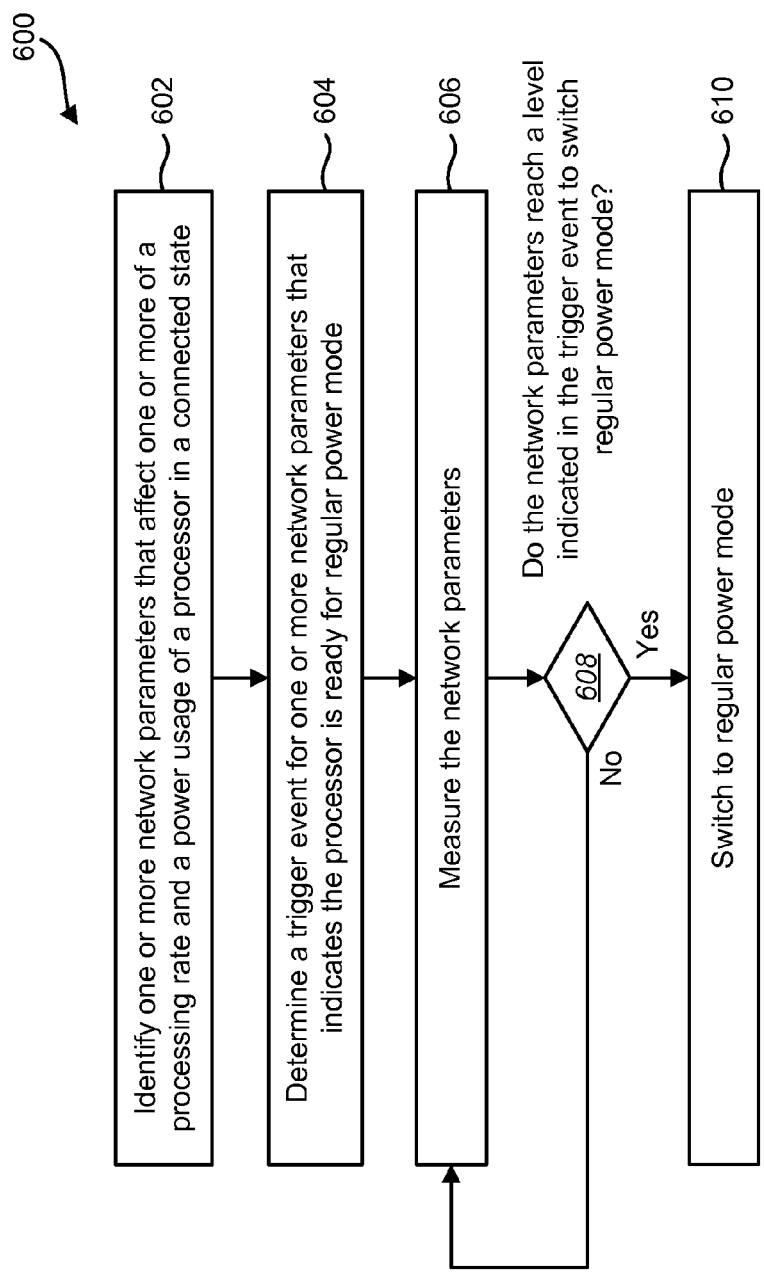
FIG. 6 is a flow diagram of a method for triggering low-power mode for a processor on a wireless communication device in accordance with various aspects of the present disclosure.

FIG. 6 is a flow diagram of a method 600 for triggering power saving mode for a processor 304a on a wireless communication device 302 in accordance with various aspects of the present disclosure. The method 600 may be performed by the wireless communication device 302 with a processor 304a in a connected state. In one configuration, the method 600 may be performed by a network parameters module 308a on the wireless communication device 302. The wireless communication device 302 may identify 602 one or more network parameters 322 that affect one or more of the processing rate and the power usage of the processor 304a in the connected state. The connected state may be a state in which the processor 304a is in active communication. The wireless communication device 302 may determine 604 a trigger event 324 for one or more network parameters 322 that indicates the processor 304a is ready to disable power saying mode and switch to regular power mode. The wireless communication device 302 may measure 606 one or more network parameters 322. For example, the wireless communication device 302 may measure an average of the transfer block size used in an uplink 318 or downlink 316 for a specified period of time. For another example, the wireless communication device 302 may measure the periodicity of the uplink 318 and downlink 316.

The wireless communication device 302 may determine 608 when the network parameters 322 reach a level indicated in the trigger event 324 to switch to regular power mode. If the trigger event 324 occurs, the processor 304a may switch 610 to regular power mode. For example, the average channel quality over a specified period of time may be low enough that the performance of the processor 304a may be increased in order to ensure the signal quality does not become poor. If the network parameters 322 do not reach the level indicated in the trigger event 324, the processor 304a may continue measuring 606 the network parameters 322 to determine if the network parameters 322 reach the level indicated in the trigger event 324.

As an example, a trigger event 324 may be configured to occur when four transfer blocks larger than a specified number of bits over a specified period of time occurs. The wireless communication device 302 may measure the size of transfer blocks until four transfer blocks larger than the specified number arrives within the specified period of time.

The wireless communication device 302 may determine the trigger event 324 has occurred. The performance of the processor 304a may then be adjusted to regular power mode, allowing the processor 304a to properly process and manage the larger transfer block sizes.

Figure 7:
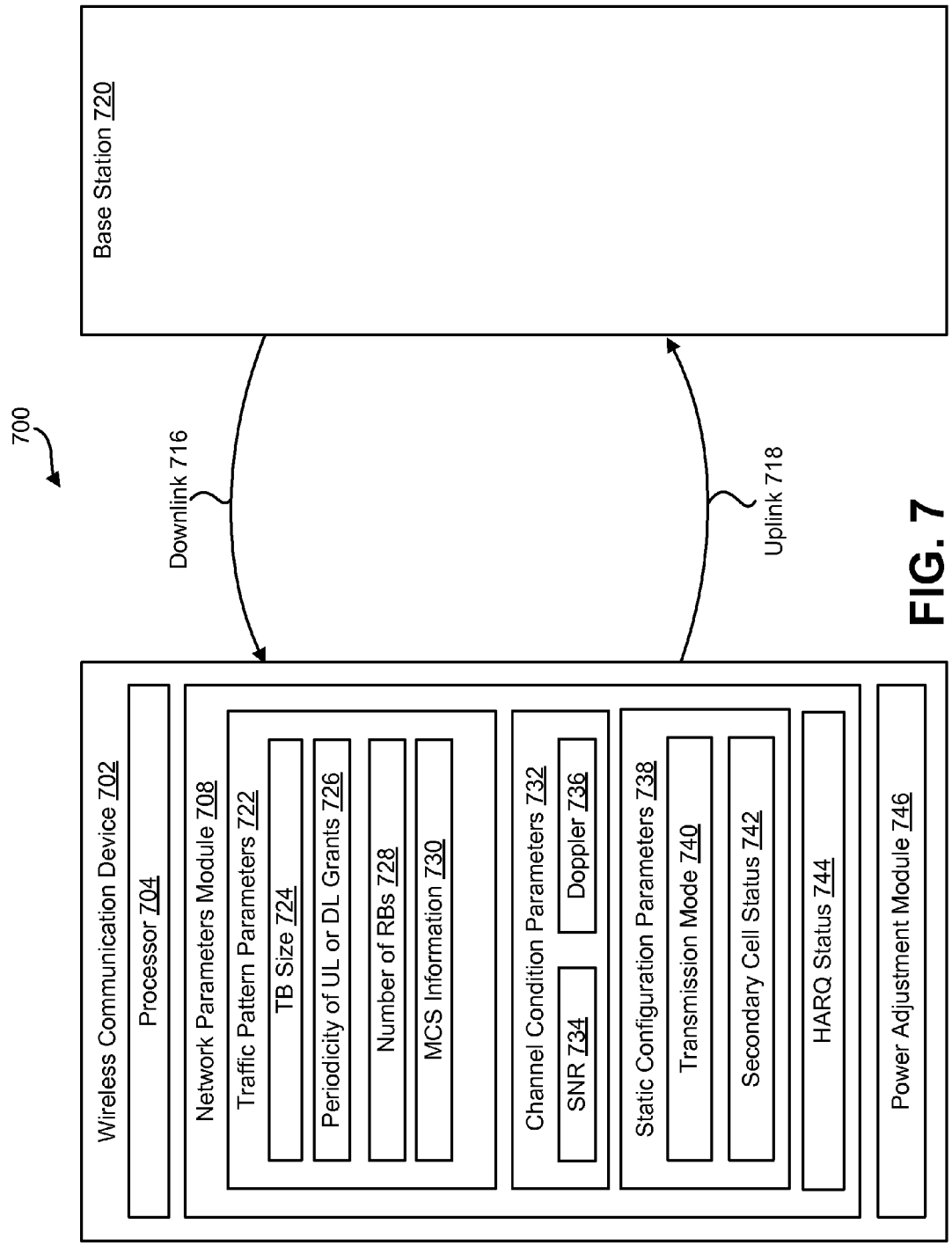
FIG. 7 illustrates certain components that may be included within a wireless communication device in accordance with various aspects of the present disclosure.

FIG. 7 illustrates certain components that may be included within a wireless communication device 702 in accordance with various aspects of the present disclosure. Communications in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 700 may utilize MIMO. A MIMO system may support both time division duplex (TDD) and frequency division duplex (FDD) systems. In a TDD system, uplink 718 and downlink 716 transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 700 may be a multiple-access system capable of supporting communication with multiple wireless communication devices 702 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 702 may be referred to as "user equipment" (UE). A wireless communication device 702 may also be referred to as, and may include some or all of the functionality of, a terminal, an access terminal, a subscriber unit, a station, etc. A wireless communication device 702 may be a cellular phone, a personal digital assistant (PDA), a wireless device, a wireless modem, a handheld device, a laptop computer, etc.

A wireless communication device 702 may communicate with zero, one, or multiple base stations 720 on the downlink 716 and/or uplink 718 at any given moment. The downlink 716 (or forward link) refers to the communication link from a base station 720 to a wireless communication device 702, and the uplink 718 (or reverse link) refers to the communication link from a wireless communication device 702 to a base station 720.

The wireless communication device 702 may include a processor 704 and a network parameters module 708. The processor 704 may be one or more of a modem, an envelope tracker, a radio frequency (RF) processor, a power management processor and a transceiver. There may be configurations where the power consumption of the processor 704 may be optimized. For example, the power consumption of the processor 704 may be optimized during a voice-over-LTE (VoLTE) call. VoLTE may have a low data rate and a low duty cycle.

To reduce the power consumption of the processor 704 when appropriate, the wireless communication device 702 may include a power adjustment module 746. The power adjustment module 746 may evaluate one or more network parameters to determine whether the processor 704 should enter a power saving mode or a regular power mode.

The network parameters may include traffic pattern parameters 722, channel condition parameters 732, static configuration parameters 738 and other parameters. Traffic pattern parameters 722 may include the transfer block (TB) size 724, the periodicity of UL or DL grants 726, the number of resource blocks (RBs) 728, the modulation and coding scheme (MCS) information 730, and an RB and MCS combination. Specific characteristics of the on-going traffic may also be used as traffic pattern parameters 722. For example, network parameters may include the average, minimum, and maximum transfer block (TB) size 724 used in the uplink 718 and downlink 716 for a specified window of time. Network parameters may also include the average, minimum, and maximum number of resource blocks 728 during a specified window of time. Network parameters may further include the periodicity of uplink 718 or downlink 716 activity, how often light sleep is triggered, and whether deep sleep is triggered. The power adjustment module 746 may have access to the uplink 718 and downlink 716 grant information to extract the modulation coding scheme (MCS) information 730, the transfer block (TB) size 724, and the number of resource blocks 728.

The channel condition parameters 732 may include the signal-to-noise ratio (SNR) 734 and the Doppler information 736. The channel condition parameters 732 may also include channel quality indicator (CQI) reports, such as the average, minimum, and maximum MCS used.

The static configuration parameters 738 may include the transmission mode 740 and the secondary cell status 742. For example, if the processor 704 is not configured for two transfer blocks (TBs), it can be evaluated whether there are any power saving features that are viable. The secondary cell status 742 may indicate whether a second or third carrier is configured or activated. The other parameters may include the hybrid automatic repeat request (HARQ) status 744, which indicates whether there are any outstanding HARQ states. The power adjustment module 746 may have access to lower-layer configuration and channel information to access the transmission mode 740, the SNR 734, and the HARQ status 744.

The power adjustment module 746 may extract all the network parameters to provide power saving mode trigger events to different entities. For example, the power adjustment module 746 may provide an interface for developers to program a specific set of trigger events for entering and exiting the power saving mode. The trigger events may be programmable. For example, the network parameters required for a specific trigger event may be programmable. The averaging intervals may be configured for each trigger event. For example, one trigger event may average the number of RBs in a 100 millisecond (ms) window to determine whether to enter power saving mode. As another example, a trigger event may average the number of RBs in a 200 ms window and the MCS for a 400 ms window to determine whether to enter power saving mode. Furthermore, leaving power saving mode (e.g., to return to normal power mode) may also be configurable. For example, once a TB size larger than a TB threshold is detected, the power saving optimization may be disabled.

Figure 8:
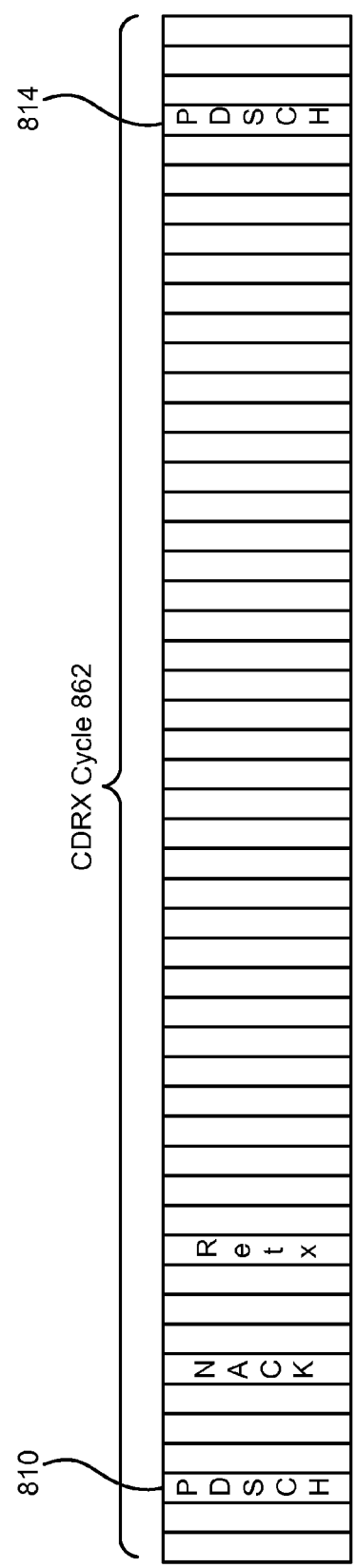
FIG. 8 is a block diagram illustrating a CDRX cycle that may adjust the clock rate and voltage level for specific rails (e.g., lowering the voltage rail Cx) in accordance with various aspects of the present disclosure.

FIG. 8 is a block diagram illustrating a connected discontinuous reception (CDRX) cycle 862 that may adjust the clock rate and voltage level for specific rails (e.g., lowering the voltage of specific power domains) in accordance with various aspects of the present disclosure. The CDRX cycle 862 may be 40 ms in duration. The goal may be to lower specific buses requests under certain conditions (for example, within the context of a VoLTE call). Conditions that may trigger the lowered requests may include a QC1 (i.e., quality-of-service reference point) bearer established, a discontinuous reception (DRX)/discontinuous transmission (DTX) configuration, small TB allocations (consistent or sufficient to cover typical VoLTE calls (e.g., x ms where there is no TB larger than 200 bytes)) and/or no active HARQ buffers.

There are also possible conditions that would allow for the disabling of the lowered requests (and returning to the original values). For example, the lowered requests may be disabled if the QC1 bearer removed. This particular optimization may also be applied to other non-VoLTE use cases. As another example, the lowered requests may be disabled if a cyclic redundancy check (CRC) error is detected on a downlink TB. In yet another example, the lowered requests may be disabled if large TBs are detected on either the uplink 718 or the downlink 716 (e.g., TBs larger than 1000 bytes).

During the physical downlink shared channel (PDSCH) 810, 814, no pending downlink HARQ is detected. Thus, no direct memory access (DMA) read occurs during wakeup. It may be possible to adjust performance level of certain domains based on the HARQ status and whether there is any CRC failure.

The offload may be split into two states based on the worst case offload requirements. For example, Offload_DMAW implies that there is either no offload or write only. Offload_DMAWR implies that there is either no offload or write or read.

Figure 9:
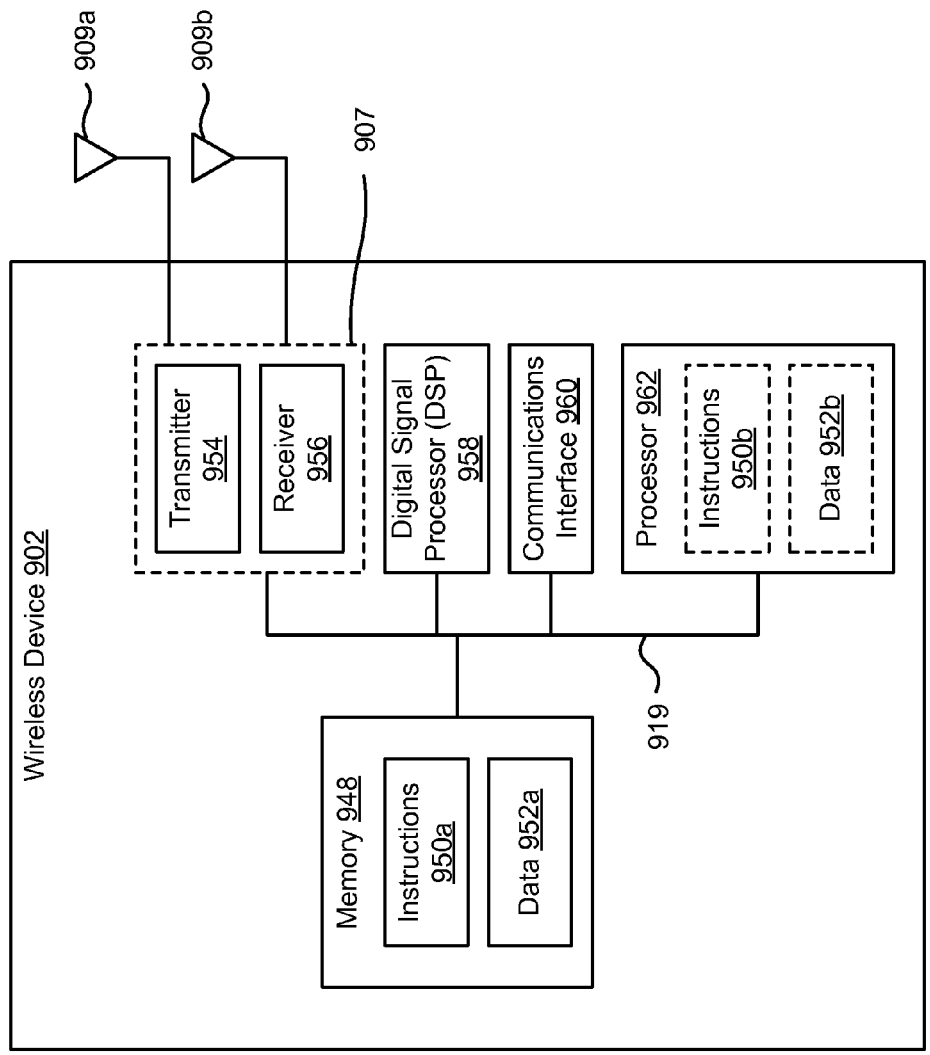
FIG. 9 illustrates certain components that may be included within a wireless communication device in accordance with various aspects of the present disclosure.

FIG. 9 illustrates certain components that may be included within an electronic device/wireless device 902. The electronic device/wireless device 902 may be an access terminal, a mobile station, user equipment (UE), a base station, an access point, a broadcast transmitter, a node B, an evolved node B, etc., such as the wireless communication device 302 illustrated in FIG. 3 or the wireless communication device 702 illustrated in FIG. 7. The electronic device/wireless device 902 includes a processor 962. The processor 962 may be a general purpose single- or multi-chip microprocessor (e.g., an ARM), a special purpose microprocessor (e.g., a digital signal processor (DSP)), a microcontroller, a programmable gate array, etc. The processor 962 may be referred to as a central processing unit (CPU). Although just a single processor 962 is shown in the electronic device/wireless device, in an alternative configuration, a combination of processors (e.g., an ARM and DSP) could be used.

The electronic device/wireless device 902 also includes memory 948. The memory 948 may be any electronic component capable of storing electronic information. The memory 948 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 952a and instructions 950a may be stored in the memory 948. The instructions 950a may be executable by the processor 962 to implement the methods disclosed herein. Executing the instructions 950a may involve the use of the data 952a that is stored in the memory 948. When the processor 962 executes the instructions 950a, various portions of the instructions 950b may be loaded onto the processor 962, and various pieces of data 952b may be loaded onto the processor 962.

The electronic device/wireless device 902 may also include a transmitter 954 and a receiver 956 to allow transmission and reception of signals to and from the electronic device/wireless device 902. The transmitter and receiver may be collectively referred to as a transceiver 907. Multiple antennas 909a-b may be electrically coupled to the transceiver 907. The electronic device/wireless device 902 may also include (not shown) multiple transmitters, multiple receivers, multiple transceivers and/or additional antennas.

The electronic device/wireless device 902 may include a digital signal processor (DSP) 958. The electronic device/wireless device 902 may also include a communications interface 960. The communications interface 960 may allow a user to interact with the electronic device/wireless device 902.

The various components of the electronic device/wireless device 902 may be coupled together by one or more buses 919, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IF-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In accordance with the present disclosure, a circuit, in a wireless communication device, may be adapted to perform face detection by evaluating a scanning window using a first weak classifier in a first stage classifier. The same circuit, a different circuit, or a second section of the same or different circuit may be adapted to evaluate the scanning window using a second weak classifier in the first stage classifier based on the evaluation by the first weak classifier. The second section may advantageously be coupled to the first section, or it may be embodied in the same circuit as the first section. In addition, the same circuit, a different circuit, or a third section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order, and/or use of specific steps and/or actions may be modified without departing from the scope of the claims.

Further, it should be appreciated that modules and/or other appropriate means for performing the methods and techniques described herein, such as those illustrated by FIGS. 2-4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation and details of the systems, methods, and apparatus described herein without departing from the scope of the claims.

What is claimed is:

1. A method, comprising:
identifying one or more network parameters that affect one or more of a processing rate and a power usage of a processor in a connected state, wherein the one or more network parameters comprise a transfer block size;
identifying a trigger event for the one or more network parameters, wherein the trigger event comprises an average transfer block size being greater than a value; and
adjusting a performance of the processor in the connected state when the trigger event occurs, wherein the adjustment of the performance of the processor causes a power saving mode to be disabled.

2. The method of claim 1, wherein the trigger event for the one or more network parameters is configurable while the processor is in the connected state.

3. The method of claim 1, wherein the trigger event for the one or more network parameters is pre-programmed before the processor is in the connected state.

4. The method of claim 1, wherein the trigger event for the one or more network parameters is an event indicating the processor is ready for a power state change.

5. The method of claim 1, wherein the one or more network parameters further comprise one or more of periodicity of uplink or downlink grants, a number of resource blocks used, modulation and coding scheme information, a signal-to-noise ratio, Doppler information, a transmission mode, a secondary cell status, and a hybrid automatic repeat request (HARQ) status.

6. The method of claim 1, wherein the one or more network parameters further comprise one or more of traffic pattern parameters, channel condition parameters, static configuration parameters, and a transmission mode configuration of a signal.

7. The method of claim 6, wherein the channel condition parameters being monitored comprise a Channel Quality Indicator (CQI) report of a Modulation Coding Scheme (MCS) used in a signal.

8. The method of claim 1, wherein the adjustment of the performance of the processor further comprises causing the processor to enter a power saving mode.

9. The method of claim 8, wherein the adjustment of the performance of the processor further comprises adjusting one or more of a clock rate and a voltage level for specific rails within the processor.

10. The method of claim 1, wherein the adjustment of the performance of the processor further causes the processor to enter a regular power mode.

11. An apparatus, comprising:
a processor;
memory in electronic communication with the processor;
instructions stored in the memory, the instructions being executable to:
identify one or more network parameters that affect one or more of a processing rate and a power usage of a processor in a connected state, wherein the one or more network parameters comprise a transfer block size;
identify a trigger event for the one or more network parameters, wherein the trigger event comprises an average transfer block size being greater than a value; and
adjust a performance of the processor in the connected state when the trigger event occurs, wherein the adjustment of the performance of the processor causes a power saving mode to be disabled.

12. The apparatus of claim 11, wherein the trigger event for the one or more network parameters is configurable while the processor is in the connected state.

13. The apparatus of claim 11, wherein the trigger event for the one or more network parameters is pre-programmed before the processor is in the connected state.

14. The apparatus of claim 11, wherein the trigger event for the one or more network parameters is an event indicating the processor is ready for a power state change.

15. The apparatus of claim 11, wherein the one or more network parameters further comprise one or more of periodicity of uplink or downlink grants, a number of resource blocks used, modulation and coding scheme information, a signal-to-noise ratio, Doppler information, a transmission mode, a secondary cell status, and a hybrid automatic repeat request (HARQ) status.

16. The apparatus of claim 11, wherein the one or more network parameters further comprise one or more of traffic pattern parameters, channel condition parameters, static configuration parameters and a transmission mode configuration of a signal.

17. The apparatus of claim 16, wherein the channel condition parameters being monitored comprise a Channel Quality Indicator (CQI) report of a Modulation Coding Scheme (MCS) used in a signal.

18. The apparatus of claim 11, wherein the adjustment of the performance of the processor further comprises causing the processor to enter a power saving mode.

19. The apparatus of claim 18, wherein the adjustment of the performance of the processor further comprises adjusting one or more of a clock rate and a voltage level for specific rails within the processor.

20. The apparatus of claim of claim 11, wherein the adjustment of the performance of the processor further causes the processor to enter a regular power mode.

21. A non-transitory computer-readable medium having instructions thereon, the instructions comprising:
code for identifying one or more network parameters that affect one or more of a processing rate and a power usage of a processor in a connected state, wherein the one or more network parameters comprise a transfer block size;
code for identifying a trigger event for the one or more network parameters, wherein the trigger event comprises an average transfer block size being greater than a value; and
code for adjusting a performance of the processor in the connected state when the trigger event occurs, wherein the adjustment of the performance of the processor causes a power saving mode to be disabled.

22. The non-transitory computer-readable medium of claim 21, wherein the one or more network parameters further comprise one or more of periodicity of uplink or downlink grants, a number of resource blocks used, modulation and coding scheme information, a signal-to-noise ratio, Doppler information, a transmission mode, a secondary cell status, and a hybrid automatic repeat request (HARQ) status.

23. The non-transitory computer-readable medium of claim 21, wherein the one or more network parameters further comprise one or more of traffic pattern parameters, channel condition parameters, static configuration parameters, and a transmission mode configuration of a signal.

24. The non-transitory computer-readable medium of claim 23, wherein the channel condition parameters being monitored comprise a Channel Quality Indicator (CQI) report of a Modulation Coding Scheme (MCS) used in a signal.

25. The non-transitory computer-readable medium of claim 21, wherein the adjustment of the performance of the processor further comprises causing the processor to enter a power saving mode or a regular power mode.

26. An apparatus, comprising:
   means for identifying one or more network parameters that affect one or more of a processing rate and a power usage of a processor in a connected state, wherein the one or more network parameters comprise a transfer block size;
   means for identifying a trigger event for the one or more network parameters, wherein the trigger event comprises an average transfer block size being greater than a value; and
   means for adjusting a performance of the processor in the connected state when the trigger event occurs, wherein the adjustment of the performance of the processor causes a power saving mode to be disabled.

27. The apparatus of claim 26, wherein the one or more network parameters further comprise one or more of periodicity of uplink or downlink grants, a number of resource blocks used, modulation and coding scheme information, a signal-to-noise ratio, Doppler information, a transmission mode, a secondary cell status, and a hybrid automatic repeat request (HARQ) status.

28. The apparatus of claim 26, wherein the one or more network parameters further comprise one or more of traffic pattern parameters, channel condition parameters, static configuration parameters, and a transmission mode configuration of a signal.

29. The apparatus of claim 28, wherein the channel condition parameters being monitored comprise a Channel Quality Indicator (CQI) report of a Modulation Coding Scheme (MCS) used in a signal.

30. The apparatus of claim 26, wherein the adjustment of the performance of the processor further comprises causing the processor to enter a power saving mode or a regular power mode.

* * * * *